BEST AVAILABLE COPY
O. Davidson,
Door Spring.
Patented Mar. 30, 1835.
8730 X
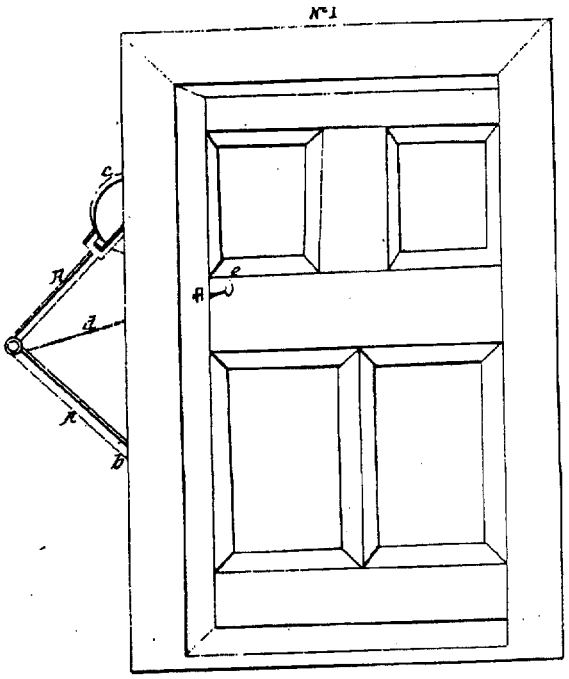
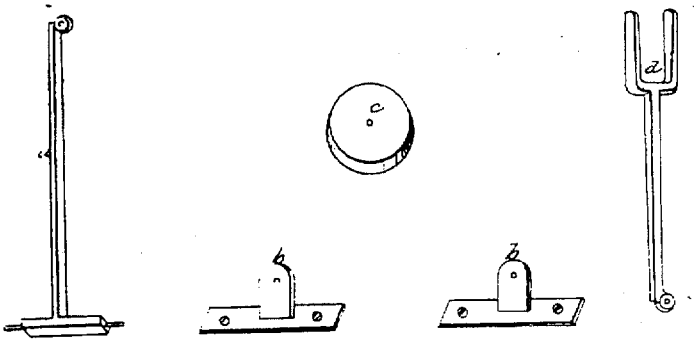
N. PETERS, PHOTO-LITHOGRAPHER, WASHINGTON, D. C.

Mar. 30, 1835 8739X 101

Oliver Davidson, of Ballston, New York

Letters Patent.

The Schedule referred to in these Letters Patent, and making part of the same, containing a description in the words of the said Oliver Davidson, himself of his improvement in an apparatus for closing doors, gates &c.

To all to whom these presents shall come; Be it known that I Oliver Davidson, of Ballston Spa, County of Saratoga and State of New York, have invented a new and useful improvement for the purpose of closing doors, gates &c. and that the following is a full and exact description of the construction and operation of the said improvement as invented or improved by me. Viz. It consists of a compound Lever placed in the door casement and connected with the door by a chord or chain, this lever is composed of two bars or rods of iron, each from ten to twelve inches in length united by a rule joint, the angle or inclenation of which bars to each other is limited by fixtures in the casement and by a chord to not less than forty five degrees. The lower extremity of the lever is fastened in the casement upon a pivot, which forms a fulcrum and permits the requisite motion. The other extremity is forked and has placed in it a weight which is intended to run in the manner of a castor, on the inner surface of the casement, the chord or chain is attached to the lever below the joint, and passing over a pulley in the casement is connected with the door by a staple. when the door is opened the chord draws the lever towards a straight line the weight moving up, but when the power applied is withdrawn the weight descends bringing back the lever to its first position and thereby closing the door. An interior view of this apparatus is given in N.º 1 of the annexed drawing. A.A. is the compound lever fastened with its lower extremity b. on a pivot in the casement. C is the weight or castor which passes up and down in the inner surface of the door casement. the chord (d.) fastened at one end on lower arm of the lever

8730X lever, and at the other in a staple in the door C. the separate parts are also
seen in the annexed drawing (A) the lower arm of the lever with the
pivot which is to be fastened in the casement (bb) the plates in the
casement in which the pivot is inserted. C. the weight or castor (d)
the upper arm of the lever forked for the admission of the castor.
The application of power by this Mechanical contrivance for
the purposes within specified is new and I claim to be the inventor Exd. Witnesses
W.H.C. Morrisett Davidson
John P. Howard Oliver Davidson.

(Drawing)

[504 Words